M. Webb,
Hay Loader.
No. 59105 — Patented Oct. 23, 1866
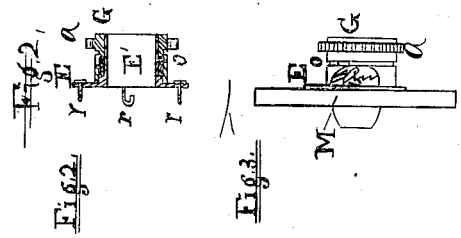
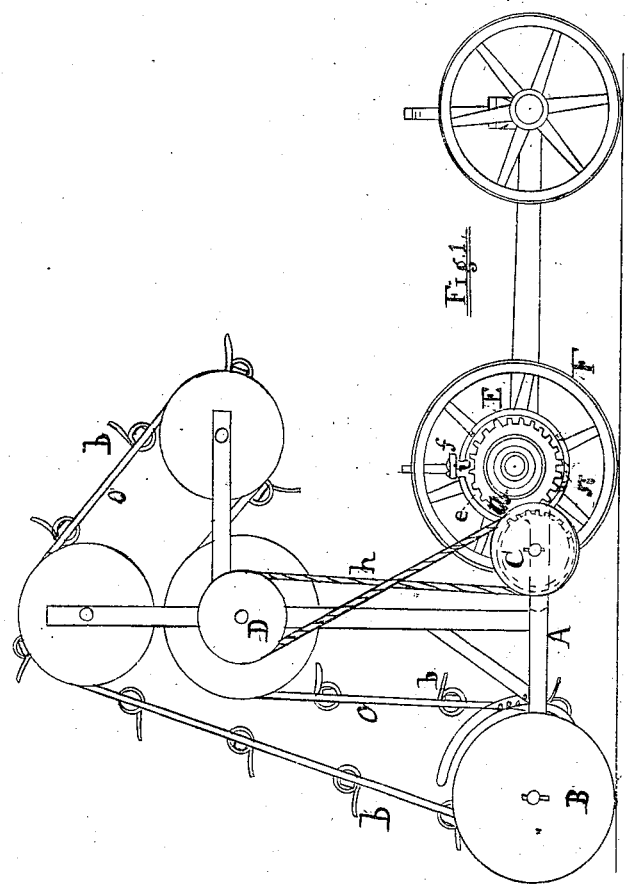
Witnesses:
G. W. Doolittle
J. A. Heald
Milo Webb
By his Attorneys
J. B. Woodruff & Son

UNITED STATES PATENT OFFICE.

MILO WEBB, OF CHENANGO FORKS, NEW YORK.

IMPROVEMENT IN MACHINES FOR RAKING AND LOADING HAY.

Specification forming part of Letters Patent No. 59,105, dated October 23, 1866.

*To all whom it may concern:*

Be it known that I, MILO WEBB, of Chenango Forks, in the county of Broome and State of New York, have invented certain new and useful Improvements in Hay Raking and Loading Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in a novel device for attaching a raking and elevating apparatus of any suitable kind to an ordinary wagon or cart.

Figure 1 is a side elevation of the wagon with the apparatus attached, and Figs. 2 and 3 are views of portions detached.

It is desirable on a farm to have the means of attaching an apparatus for raking and loading hay to the ordinary wagon or cart, and thus avoid the expense of providing a separate vehicle for that special purpose.

In the drawings, A represents the frame of the raking and loading apparatus, which may be of any desired construction, though I prefer the style there shown, and consisting of an endless belt, O, provided with the spring-teeth $b$, arranged to carry the hay up on the side next to the wagon. The rear end of this frame rests upon a pair of wheels, B, by which it is supported, and which keep the teeth $b$ of the belt O in close contact with the ground, so as to gather the hay as it passes along. This frame A is attached to the hubs of the hind wheels, F, in such a manner that it is free to rise and fall at its rear end, thus permitting the wheels B and the belt O to adjust themselves perfectly to the undulations of the surface.

To attach this apparatus to the wagon I provide a tubular sleeve, E', (see Fig. 2,) of proper size to fit over the hub of the wheel F, and secure it to the wheel by means of bolts or clips $r$, passing through the flange E and engaging around the spokes of the wheel. A ratchet-collar, $l$, (see Fig. 2,) is provided on this sleeve close against the flange E. I then provide a sleeve, G, of proper size to fit over the sleeve E', and having a pawl, $m$, pivoted on its interior in such a position as to engage with the teeth of the ratchet $l$, as shown in Fig. 3, where a portion of G is broken away to show these parts. By these means it will be seen that the sleeve G is made to turn with the wheel F when the latter moves forward, while the wheel can move backward without turning the sleeve. This sleeve G is provided with a cog-wheel, $a$, which gears into a corresponding wheel attached to the shaft of pulley $c$, around which latter a belt, $h$, passes to pulley D, thus imparting motion to the belt O.

A yoke, $e$, (see Fig. 1,) is attached to the front end of frame A, and encircles the sleeve G, the latter being provided with a groove, $o$, as shown in Figs. 2 and 3, to receive it. This yoke is jointed at $n$ of Fig. 1, and is provided at its upper side with projecting arms $i$, to one of which a loop, $f$, is pivoted so as to encircle both of said arms, and thus lock them together, as shown, thereby holding them in the groove $o$ of sleeve G, the yoke $e$ fitting loosely in the groove, and not interfering with the rotation of the sleeve and its cogs $a$.

It will thus be seen that by simply raising the loop $f$ the yoke $e$ can be opened and the apparatus instantly detached from the wagon, and the latter thus be left free to convey the load to the barn, or wherever desired, and the apparatus be as readily attached for loading again when the wagon is returned, thus avoiding the necessity of carrying the apparatus from the field with the wagon. By having two or more wagons provided with the sleeves, the apparatus can be used to load one while the other is being unloaded, and the labor of gathering the hay thus greatly expedited.

Having thus described my invention, what I claim is—

The sleeves E' and G, attached to the wheels, and arranged to operate in combination with the yoke $e$, substantially as and for the purpose set forth.

Subscribed to on this 15th day of June, 1866.

MILO WEBB.

Witnesses:
 C. B. MILLER,
 S. B. UNDERILL.